(No Model.)

C. PHELPS.
HOLDBACK FOR CARRIAGES.

No. 273,596. Patented Mar. 6, 1883.

Witnesses:
Newton Cramford
William S. Poulter

Inventor:
Chamberlayne Phelps
By W. V. Burris
Attorney.

United States Patent Office.

CHAMBERLAYNE PHELPS, OF WESTMORELAND, NEW YORK.

HOLDBACK FOR CARRIAGES.

SPECIFICATION forming part of Letters Patent No. 273,596, dated March 6, 1883.

Application filed July 31, 1882. (No model.)

*To all whom it may concern:*

Be it known that I, CHAMBERLAYNE PHELPS, a citizen of the United States of America, residing at Westmoreland, in the county of Oneida and State of New York, have invented certain new and useful Improvements in Holdbacks for Vehicles, of which the following is a specification, reference being had therein to the accompanying drawings.

My invention consists of a holdback having a base-plate with the middle portion bent upwardly and the back portion provided with a curved hook, and having a curved spring adjusted between the bent portion of the plate and the curved hook, so as to prevent the holdback-strap from slipping off the hook, except in case, by accident or otherwise, the horse moves forward out of the shafts, in which case the strap will automatically become disengaged from the holdback as hereinafter fully described.

Figure 1:
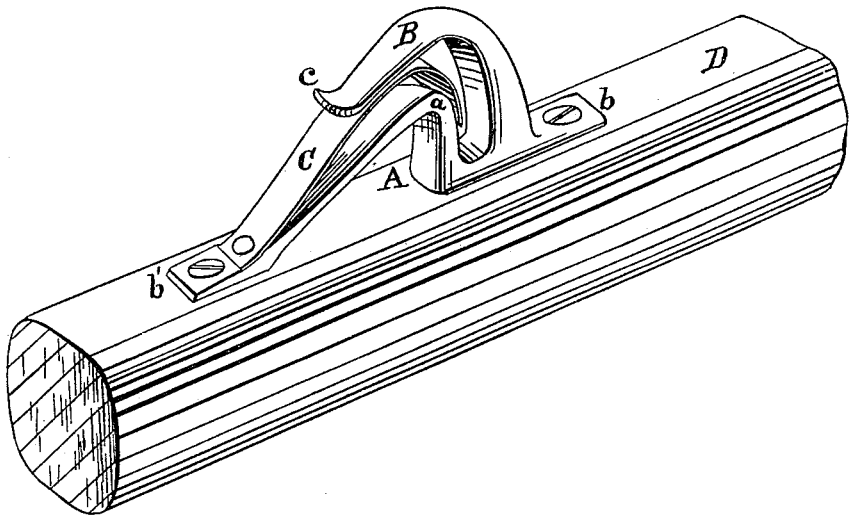
Figure 2:
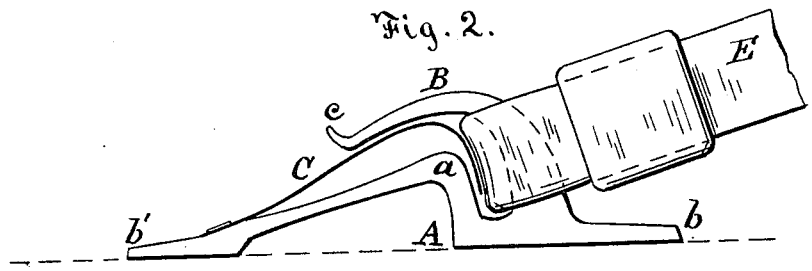

In the drawings, Figure 1 is a perspective view of one of my improved holdbacks attached to the shaft of a vehicle. Fig. 2 is a side view, showing the holdback-strap in the holder.

A is the base-plate, having the upward bend $a$ and the ends $b$ $b'$, provided with holes to receive the bolts which fasten the holdback to a shaft, D. The back portion of the plate is provided with a curved hook, B, formed on the plate. The forward end of this hook extends over the bent portion of the spring and of the plate, terminating with an upwardly-curved end, $c$. The hook is located sufficiently back of the bent portion of the plate to allow the requisite space for the holdback-strap E and the back portion of the spring C, the forward end of which is fastened to the plate, near the end $b'$, and the middle and back portion of the spring is bent or curved to conform nearly to the shape of the bent portion of the plate, and the back portion of the spring is extended under the hook and downward below the upward bend $a$, as shown in the drawings. It will be observed that the spring closes the space between the curved hook and the bent portion of the plate, so as to prevent effectually the strap from slipping off the hook, except when, by accident or otherwise, the horse is moved forward out of the shafts, in which case the strap will readily pass edgewise between the spring and hook, becoming thus automatically detached from the holder. If the base-plate were made straight, the great pressure produced upon the hook by the weight of a heavy load when going down a steep hill would be liable to spring and possibly break the plate in the middle, unless strengthened by thickening of the metal, which would increase the quantity of metal and weight of the holdback. It will be readily seen that in my improved holdback the strain is produced nearly on a direct line with the forward portion of the bent part of the base-plate, and hence its power of resistance is greater, and may be made with sufficient strength, of less material than a holdback with a straight base-plate. The upward bend serves also to protect the curved spring from injury when subjected to severe pressure. And this form of a base or bed plate is more readily attached to the shafts of carriages already finished, as is often required. It is always desirable to fit the bed-plate down as closely as possible upon the shaft, and a straight bed-plate requires the cutting away of a long strip of the leather covering that portion of carriage-shafts, while my plate with the middle bend requires the cutting away of only small portions of the leather to receive the bearing-surfaces of the ends $b$ $b'$.

This holdback is easily constructed and applied, and combines elegance of form, strength, and safety in use with cheapness of construction.

What I claim as new, and desire to secure by Letters Patent, is—

The holdback consisting of the base-plate A, having the middle upward bend, $a$, the curved hook B, and the curved spring C, adjusted between the bent portion of the plate and the curved hook, substantially as and for the purposes described.

In testimony whereof I affix my signature in presence of two witnesses.

CHAMBERLAYNE PHELPS.

Witnesses:
E. A. YOUNG,
I. B. HUGHES.